Oct. 2, 1934.   P. C. STROUD ET AL   1,975,594
OIL RECLAIMING MACHINE
Filed Sept. 9, 1931

INVENTORS
Perry C. Stroud
R. Lyle Brace
BY
Pennie Davis Marvin & Edmonds
ATTORNEYS Patented Oct. 2, 1934

1,975,594

UNITED STATES PATENT OFFICE 1,975,594

OIL RECLAIMING MACHINE

Perry C. Stroud and Russell Lyle Brace, Portage, Wis.; said Brace assignor to said Stroud Application September 9, 1931, Serial No. 561,982

8 Claims. (Cl. 196—16)

This invention relates to a process and apparatus for reconditioning or purifying lubricating oils contaminated with solid particles and volatile fluids. In other words our invention relates to a process and apparatus especially suitable for reconditioning used crank case oil.

One of the objects of our invention is to provide apparatus for reconditioning lubricating oil which apparatus is inexpensive to manufacture, reliable in operation and which may be operated and maintained in good operating condition with a minimum of effort. One embodiment of our invention includes means for subjecting contaminated oil to the action of a purifying chemical solution, the oil being passed through a body of the treating solution in a thin film. The film of oil is progressively passed through the body of treating solution, or, in other words, the oil is continuously supplied to the body of treating solution and continuously delivered therefrom. Our apparatus preferably includes means for segregating the treated oil from the treating solution and this is accomplished in such a manner that the sludge formed during the treating operation is also separated from the treated oil. The oil is preferably passed through the treating solution by hydraulic means and the construction and arrangement of the apparatus is preferably such that the oil is fed into a body of the solution at a substantially constant rate.

The contaminated oil after being partially purified by the action of a treating solution is then subjected to the action of an evaporator for the purpose of removing volatile fluids from the oil. During this operation the oil is heated and after the volatile constituents have been removed the heated oil is passed in heat exchanging relation with the purifying solution previously employed in the treatment of the oil supplied to the evaporator. The oil is then passed through a strainer adapted to remove all remaining foreign particles, including any particles of carbon, or coke, which may be formed in the evaporator.

The chemical treating apparatus of our invention is preferably of improved construction having a plurality of louvers arranged one above the other and each louver inclined at an acute angle to the horizontal. The receptacle containing these louvers is normally supplied with a treating solution and the contaminated oil is fed into the receptacle at a point below the lowest louver therein. The oil then passes along the lower surface of each louver gradually advancing toward the top of the receptacle. The oil spreads out in the form of a thin film covering the lower surface of each louver and is therefore subjected to the action of the treating solution in the most efficient manner.

We prefer to employ an evaporator of improved form associated with the chemical treatment apparatus. In general the preferred embodiment of our evaporator comprises a cone-shaped evaporating pan, a heating element mounted within this pan, and means for discharging oil onto the outer surface of the cone-shaped pan. The pan is preferably corrugated to provide a series of receptacles arranged so that the oil overflows from one receptacle to another until it leaves the evaporating pan. A vapor deflector encloses at least a portion of the evaporator pan and this deflector is preferably tapered and arranged with the smaller end uppermost. Means may be provided for supplying a stream of air which passes between the vapor deflector and the evaporating pan and facilitates the discharge of vapor from the evaporator. A condensing hood may be positioned above the evaporating pan and such condensate as may form on this hood is preferably conducted away from the immediate vicinity of the pan so as to prevent re-contamination of the oil by the condensate. It is feasible to arrange the vapor deflector so that it may also serve as a means for conducting condensate away from the above mentioned hood so as to prevent the condensate from dropping back onto the evaporating pan.

The various objects and advantages of our invention will be more apparent upon considering the following detailed description which is to be taken in conjunction with the accompanying drawing in which Fig. 1 is a vertical section view of one embodiment of our improved apparatus;

Figure 1:
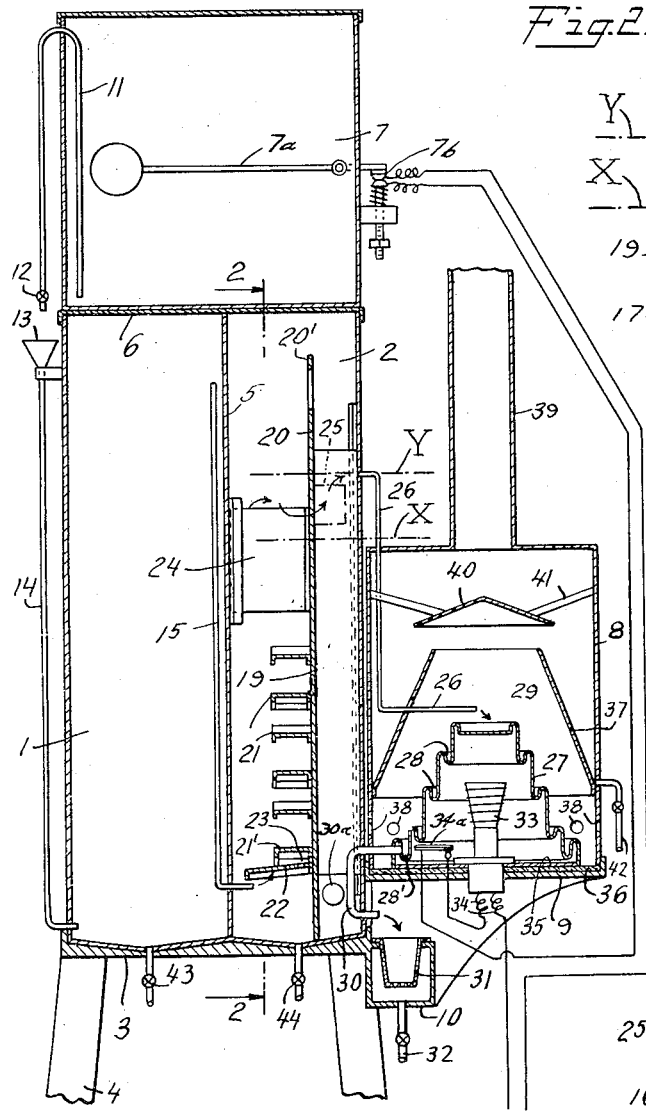

In the accompanying drawing we have illustrated two receptacles 1 and 2 arranged side by side and mounted on a common base 3 carried by the supports 4. The receptacles 1 and 2 may be separate receptacles mounted close together, or they may be parts of a common receptacle separated by a partition 5. A cover 6 is provided for the receptacles 1 and 2 and is adapted to support a water tank 7. An evaporator shell, or container 8, is mounted on a bracket 9 which may be fastened to or constitute a part of the base 3.

A filter cabinet 10 may also be mounted on or carried by the base 3, this cabinet being preferably located at a point below the bottom of the evaporator 8.

It is believed that the improved process and apparatus may be best understood by first considering in general the manner in which the several parts illustrated in Fig. 1 cooperate. The receptacle 1 is adapted to receive contaminated oil, such as used automobile crank case oil. The receptacle 2 is adapted to contain a treating solution such as tribasic sodium phosphate dissolved in water. Water from the tank 10 is gradually fed into the bottom of the receptacle 1 in a manner hereinafter described to gradually or progressively raise the body of contaminated oil in this receptacle. The oil is progressively discharged from the receptacle 1 into the bottom of the sludge tank or receptacle 2, wherein it is subjected to the action of the treating solution. Thereafter the treated oil is progressively delivered to the evaporator where volatile fluids are removed from the oil by heat. The heated oil is then brought into heat exchanging relation with the solution in the tank 2 and thereafter it is passed through the filter chamber 10. The oil is then completely purified and ready for use.

Referring to the details of the construction illustrated in the accompanying drawing it will be noted that the water tank 7 mounted on top of the receptacles 1 and 2 is provided with a siphon pipe 11 communicating with the inside of the water tank at a point near the bottom thereof and passing through the side of the tank near the top thereof. The siphon pipe delivers water through a regulating valve 12 near the discharge end thereof. This siphon is self-priming because the upper end thereof is below the top of the tank and accordingly when the tank is filled with water the intake side of the siphon is filled throughout its entire length and there is sufficient head above the siphon to cause water to flow downward through the discharge end of the siphon. The water discharged from the siphon flows into a funnel 13 at the upper end of a pipe 14. The pipe 14 delivers the water to the bottom of the oil receptacle 1. A similar pipe 15 communicates with the upper portion of the receptacle 1 and with the lower portion of receptacle 2. This pipe 15 constitutes means for delivering oil from the receptacle 1 into the bottom of receptacle 2 and it will be understood that as water is supplied to the bottom of receptacle 1 the oil in this receptacle is forced upward until it overflows through the pipe 15 and into the bottom of the receptacle 2.

Figure 2:
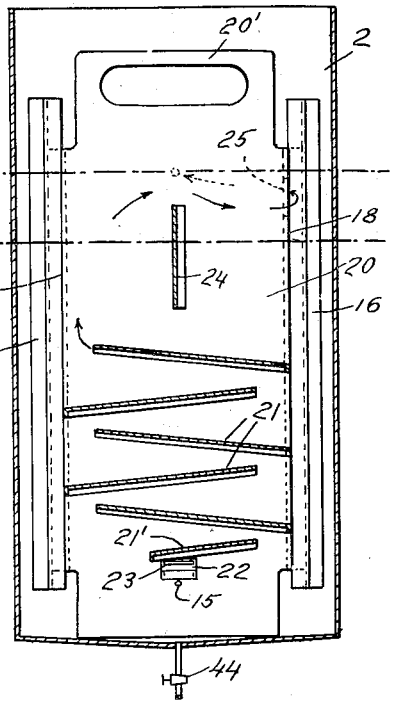
Fig. 2 is a section view of a portion of the apparatus shown in Fig. 1 and taken on line 2—2 of Fig. 1.
Figure 3:
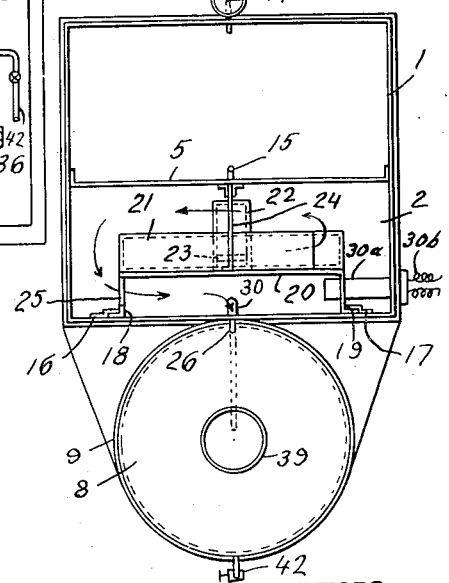
Fig. 3 is a plan view of a portion of the apparatus shown in Fig. 1.

Upon referring to Figs. 1 and 2 it will be noted that one side of the receptacle 2 is provided with a pair of guide strips 16 and 17 adapted to receive flanges on the bent side portions 18 and 19 of a plate 20. The plate 20 is thus removably mounted in the receptacle 2. A plurality of louvers 21 are mounted with their side edges supported by the removable plate 20. These louvers have at each side thereof downwardly-extending flanges and the louvers are arranged one above the other, each louver extending at an acute angle to the horizontal. The louvers are somewhat shorter than the length of the receptacle 2 in the direction in which the louvers extend and upon referring to Fig. 2 it will be noted that the louvers are arranged in staggered relation, alternate louvers extending into contact with the same side flange of the supporting plate 20. An additional louver or trap 22 is also mounted on the supporting plate 20 and the delivery end of the feed pipe 15 delivers oil directly into this trap 22. The trap is inclined at an angle to the horizontal and the upper end of the trap is provided with an aperture 23 through which the oil discharges. The oil then comes in contact with the lower surface of a louver 21'. The oil then spreads out in the form of a thin film and advances along this louver 21' which is inclined upward. The oil is then delivered to the lower surface of the next louver where its general direction of travel is reversed because of the opposite inclination of this louver. The oil spread out in the form of a thin film thus advances from one louver to another gradually working its way toward the top of the receptacle 2. The treating solution in the receptacle 2 thus has ample opportunity to come in contact with all portions of the contaminated oil. The oil is of such a nature that as the oil advances along the louvers there is sufficient agitation of the oil molecules so that substantially all of them are at one time or another brought into direct contact with the treating solution.

After the oil leaves the uppermost louver it is then progressively discharged over a baffle 24. This baffle prevents the discharged oil from carrying with it the sludge formed by the reaction of the treating solution on the oil, except such sludge as may float on the surface of the oil. Most of the sludge is heavier than the oil and accordingly floats on the surface of the treating solution and it is this sludge that is retained in the container 2, back of the baffle 24. The surface level of the treating solution in receptacle 1 is normally maintained at the level indicated at X and it will be noted that the baffle 24 extends above this level. The oil after passing over baffle 24 flows around the side edges of the supporting plate 20 and through openings 25 in the side flanges 18 and 19. The upper edge of each of these openings 25 is normally below the level of the liquid in the receptacle 2, this level being indicated at Y. Accordingly the upper edge portion of each of the openings 25 serves as a baffle preventing the discharge from the receptacle 2 of the sludge floating on the surface of the oil. The clear oil flowing through the openings 25 then flows through a discharge pipe 26 into the evaporator 8 and it will be understood that as water is gradually fed into the bottom of receptacle 1, oil is progressively discharged into the bottom of receptacle 2 where it is treated and then discharged at the same rate through the discharge pipe 26 into the evaporator.

The evaporator comprises an enclosing shell shown at 8 containing an evaporating pan 27. This pan 27 is preferably in the form of a cone and it is preferably provided with a plurality of corrugations forming a series of receptacles 28. The top of the evaporating pan is provided with a recess forming a cup or receptacle 29. After this top receptacle fills up the oil overflows to the annular receptacle nearest the top of the evaporating pan and from this receptacle the oil again overflows into the next and each succeeding receptacle until it reaches the lowest receptacle indicated at 28'. From this lowest receptacle the oil flows through a pipe 30 which passes through the wall of the receptacle 2. The oil is then discharged through the filter cabinet 10 which contains a filter 31 and communicates with a discharge pipe 32.

Within the cone-shaped evaporator pan 27 we have provided an electric heating element 33 to which electric current may be supplied through leads 34. A heat reflector pan 35 closes the bottom of the evaporator pan and serves to reflect heat upward against the inner surface of the pan. Accordingly the pan is heated by this reflected heat as well as by direct heat from the heating element 33. The reflector pan 35 is supported on an insulated base 36 carried by the bottom of the evaporator receptacle 8.

In order to regulate the temperature of the pan 27 and to prevent overheating of the same we may provide a thermostatic switch 34a including an invar metal element, or other heat sensitive element responsive to the temperature of the pan. The heat sensitive element of the switch is preferably mounted in direct contact with the lower portion of the pan 27 and the switch is arranged to break the circuit including the leads 34 which normally supply current to the heating element 33. Whenever the temperature rises to an excessive value the switch operates to break the circuit and interrupt the supply of current to the heating element. During normal operation the flow of oil over the pan 27 maintains the pan at a sufficiently low temperature so that the switch 34a remains closed.

The circuit including the leads 34 is also controlled by a float 7a in the tank 7. The circuit for the heating element 33 includes contacts 7b operated by the float 7a and the arrangement is such that when substantially all of the water has been siphoned out of the tank 7 the float 7a opens the contacts 7b to interrupt the supply of current to the heating element 33. This is desirable for when the water stops flowing from the tank 7 the supply of oil to the evaporator pan 27 is interrupted and there is no need for supplying further energy to the heating element of the evaporator.

Within the evaporator shell 8 we have provided a vapor deflector 37 preferably tapered and arranged with the smaller end uppermost. This vapor deflector surrounds the upper portion of the evaporator pan. We have provided a plurality of openings 38 around the base of the evaporator shell 8 for admitting air into this shell and we have illustrated a vapor takeoff pipe 39 through which air, vapor and gases may be discharged from the evaporator. The construction and arrangement of the parts is preferably such that the current of air supplied through the openings 38 passes upward through the vapor deflector 37 and the evaporating pan 27, thus facilitating removal of the vapor from the immediate vicinity of the pan. A hood 40 supported on brackets 41, carried by the shell 8, may be mounted above the vapor deflector 37 and the outer edge of this hood preferably overhangs the upper edge of the tapered vapor deflector. The lower edge of the vapor deflector is preferably soldered, or otherwise secured to the wall of the evaporator, and the construction and arrangement of the hood 40 and the vapor deflector 37 are such that condensate forming on the hood drips down onto the outer surface of the vapor deflector and collects near the lower extremity thereof between the deflector and the shell 8. Such condensate may be withdrawn from the shell through a suitable connection such as that illustrated at 42.

The oil discharged from the receptacle 2 through the pipe 26 drips onto the evaporating pan 27 where it is heated to remove volatile fluids, some of which condense on the hood 40 and are ultimately withdrawn through the discharge connection 42 and the remainder of which pass out through the vapor takeoff pipe 39. The heat treated oil ultimately collects in the lower annular receptacle 28′ from which it is discharged into the filter cabinet through the pipe 30. This hot oil is brought into heat exchanging relation with the treating solution in the receptacle 2 due to the fact that the pipe 30 extends into this receptacle. The treating solution and the oil passing through the same may also be heated by a heating element 30a arranged preferably near the bottom of the receptacle 2. This heating element is preferably an electrical heating element and it may be supplied with current through the leads 30b.

By using the process and apparatus herein described it is possible to recondition used lubricating oil to produce a product having excellent lubricating qualities and especially suitable for use in internal combustion motors. The reconditioned oil is extremely stable and does not break down in operation from the heat generated in the motor. It does not become diluted by the fuel as readily as new oil because the viscosity of the reconditioned oil is not first reduced by breaking down of the oil and accordingly a highly efficient piston ring seal is maintained. Furthermore the reconditioned oil does not permit the accumulation of as much solid or abrasive material as new oil, first, because the reconditioned oil does not break down and form carbon, and, second, because it does not permit unburned fuel to flush past the piston rings and wash the dirt into the crank case. When new oil is used in the crank case of an internal combustion motor, mild petroleum acids are formed which are desirable in that they give the oil a greater ability to "wet" moving bearing surfaces and at the same time cling to the metal surfaces more readily, resulting in a film of oil that is thicker than oil not containing such acids. By treating used oil according to our invention sulphuric acid in the contaminated oil is removed and the beneficial petroleum acids or organic acids remain in the oil.

The receptacles 1 and 2 and the tank 7 can be made out of inexpensive sheet metal and this is also true of the partition 5 separating the receptacles 1 and 2 and of the louvers and supporting plate within the receptacle 2. The receptacles 1 and 2 may be provided with drain connections 43 and 44 respectively for draining water from the receptacle 1 and exhausted treating solution from the receptacle 2. It will be understood that the process is in a sense continuous or progressive in that after the receptacles 1 and 2 are filled with oil and treating solution respectively and the receptacle 7 filled with water, the treating operation progresses gradually until all of the oil in the receptacle 1 has been chemically treated and subjected to the action of the evaporator.

The construction of the evaporator is such that the several parts can be made out of inexpensive materials and assembled at low cost. One of the advantages of the construction illustrated in the accompanying drawing resides in the fact that an ordinary electric heating element, such as that shown at 33 can be employed for supplying the heat necessary to vaporize the volatile fluids in the oil.

The treating solution in the receptacle 2 may consist of tribasic sodium phosphate dissolved in water in the approximate proportions of one pound of phosphate to two gallons of water. The water is preferably brought to near the boiling point before the phosphate is added thereto. After this solution has been prepared enough of it is poured into the receptacle 2 to bring the level of the solution up to the point indicated at X. The louver support 20 is inserted in the receptacle 2 and to facilitate this operation the support 20 may be provided with a handle 20', at the upper end thereof. After the receptacle 1 is filled with oil and the tank 7 with water the valve 12 may be opened to permit water to flow from the tank 7 into the pipe 14 from which it is discharged into the bottom of the receptacle 1 to force the oil upward until it overflows through the pipe 15 into the bottom of receptacle 2. The oil then passes in a thin film through the body of treating solution in the receptacle 2, the oil progressing from one louver to another until it reaches the top of this receptacle. From this point the oil flows over the baffle 24 through the openings 25 and then through the discharge pipe 26 in the evaporator. In the sludge receptacle 2 the treating solution removes the oil film surrounding any solid particles in the oil and permits the water, which has a greater affinity for such particles than the oil, to surround the particles and hold them in suspension in the treating solution. The chemical in the solution neutralizes the sulphuric acid present in the contaminated oil forming a salt solution which remains in the receptacle 2. The mild organic acids are not completely neutralized by the chemical in the treating solution because the oil does not remain in the receptacle 2 long enough for such action to take place.

The rate of treatment of the contaminated oil is determined entirely by the rate at which water is permitted to flow from the tank 7 and accordingly the operation of the apparatus can be controlled by simply manipulating the control valve 12 in the siphon 11. The chemically treated oil is delivered into the evaporator at a rate corresponding to the rate at which oil is delivered into the bottom of the sludge receptacle 2. Heat delivered by the heating element 33 may be maintained constant and by varying the rate of flow of the oil (as by adjusting the valve 12) the temperature of the oil discharged from the evaporator pan can be regulated and this determines the viscosity of the finished product. If desired an automatic temperature control means may be employed for maintaining a constant temperature in the evaporator.

It is to be understood that our invention is not limited to the particular details of construction illustrated and described but includes such modifications thereof as fall within the scope of the appended claims.

We claim:

1. Apparatus of the type described comprising a receptacle for holding a body of treating solution, a plurality of louvers within said receptacle arranged one above the other, each louver being disposed at an acute angle to the horizontal and being open at its higher end, and means for feeding contaminated oil into the receptacle at a point below the lowest louver therein, whereby the oil is caused to flow in a continuous thin film along the lower surfaces of the several louvers from the lower to the higher ends of the louvers.

2. Apparatus of the type described comprising a receptacle for holding a body of treating solution, a louver within said receptacle disposed at an acute angle to the horizontal and open at its higher end, and means for feeding contaminated oil into the receptacle at a point below the said louver whereby the oil is caused to flow in a continuous thin film along the lower surface of the louver from its lower to its higher end.

3. Apparatus of the type described comprising a receptacle for holding a body of treating solution a removable support in said receptacle, a plurality of louvers mounted on said support and arranged one above the other, each louver being disposed at an acute angle to the horizontal with its upper end open and its lower end closed, and means for feeding contaminated oil into the receptacle at a point below the lowest louver therein, whereby the oil is caused to flow in a continuous thin film along the lower surface of each louver from its lower to its higher end.

4. Apparatus of the type described comprising a receptacle for holding a body of treating solution, a second receptacle for holding a body of contaminated oil, and hydraulic means for progressively feeding the oil from said second receptacle through the body of treating solution in said first receptacle.

5. Apparatus of the type described comprising a receptacle for holding a body of treating solution, a second receptacle for holding a body of contaminated oil, and hydraulic means for progressively feeding the oil from said second receptacle through the body of treating solution in said first receptacle, said hydraulic means comprising a water tank and means for discharging water therefrom at a substantially constant rate into the bottom of said second receptacle.

6. Apparatus of the type described comprising a receptacle for holding a body of treating solution, a second receptacle for holding a body of contaminated oil, and hydraulic means for progressively feeding the oil from said second receptacle through the body of treating solution in said first receptacle, said hydraulic means comprising a water tank mounted above said receptacles and a siphon for discharging water from said tank into the bottom of said second receptacle.

7. Apparatus of the type described comprising a receptacle for holding a body of treating solution, a second receptacle for holding a body of contaminated oil, and hydraulic means for progressively feeding the oil from said second receptacle through the body of treating solution in said first receptacle, said hydraulic means comprising a water tank mounted above said receptacles and a siphon for discharging water from said tank into the bottom of said second receptacle, and means for controlling the flow of water through the siphon.

8. Apparatus of the type described, comprising a receptacle for holding a body of treating solution, a second receptacle for holding a body of contaminated oil, hydraulic means for progressively feeding the oil from said second receptacle through the body of treating solution in said first receptacle and means including a heating element for heating the oil, said hydraulic means comprising a tank for holding a body of water, means for delivering water from said tank into the bottom of said second receptacle to discharge oil therefrom into said first receptacle, and means responsive to the level of the water in said tank for controlling the supply of heat to said heating element.

PERRY C. STROUD.
RUSSELL LYLE BRACE.